Oct. 18, 1927.

J. S. GULLBORG 1,645,699

INDICATOR

Filed March 8, 1923

Witnesses:
W. F. Kilroy
Harry R. L. White

Inventor
John S. Gullborg

Patented Oct. 18, 1927.

1,645,699

UNITED STATES PATENT OFFICE.

JOHN S. GULLBORG, OF CHICAGO, ILLINOIS.

INDICATOR.

Application filed March 8, 1923. Serial No. 623,662.

My invention relates to indicators, and more particularly to an indicator for use in an automobile for indicating directions. Such indicators are generally designated by the term "compass".

It is not unusual that the driver of an automobile becomes confused in directions and is unable to ascertain his bearing in strange surroundings, particularly when the heavenly bodies are not visible, as on a cloudy day or at night time.

I provide a magnetic indicator or compass which is mounted on the roof or top of the car so as to be visible readily to the driver without being in the way, and also to remove the instrument as far as possible from the magnetic material of the automobile itself. It is substantially impossible to place the usual compass in the car in such position that it will not be affected by the magnetic material of which the car is composed, and I have therefore found it necessary first, to provide a novel inverted structure; and second, to mount the compass overhead, that is, as far as possible from the frame and engine of the automobile, so that the needle or other magnetic controlling device of the indicator is little affected by the presence of the metal of the automobile.

In order to acquaint those skilled in the art with the manner of constructing and operating by invention, I shall now describe a specific embodiment of the same in connection with the accompanying drawings in which:—

Figure 4:
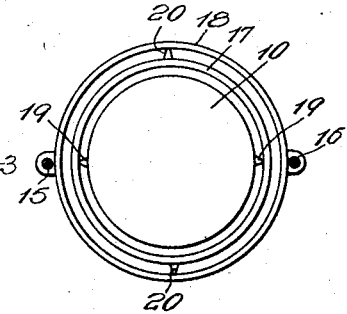

Fig. 4 indicates the manner of mounting the device of my invention in gimbals.

Figure 1:
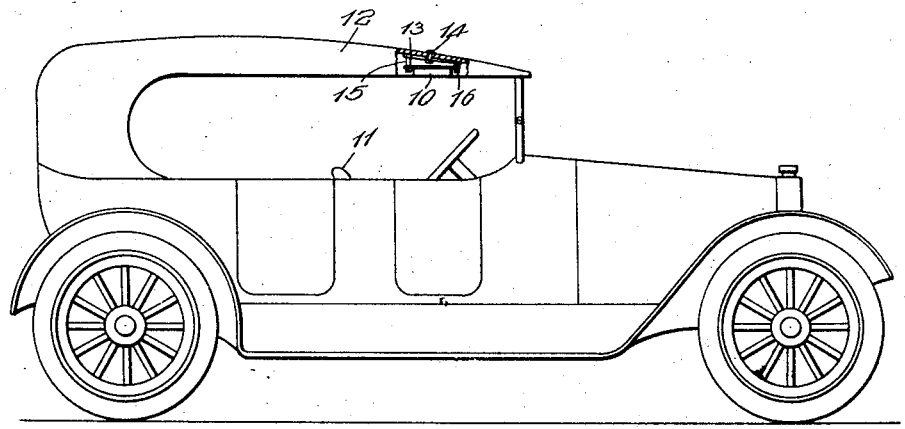
Fig. 1 is a side view of an automobile with the top partly broken away indicating the manner of mounting a device embodying my invention in the usual touring car.
Figure 3:
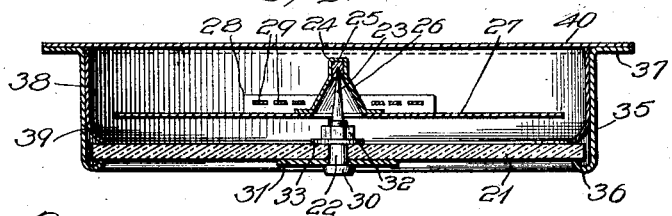
Fig. 3 is a cross sectional view taken on the line 3—3 of Fig. 2.

As shown in Fig. 1, the indicator 10 which faces down preferably in the central median portion of the car lies above the seat 11, and is housed within the top 12. A mounting plate 13 having a suitable bolt 14 passing through the top of the automobile top or roof secures said mounting plate 13 to said top or roof. Bolts or posts 15 and 16 connect the instrument 10 with the mounting plate 13 in such a manner as to hold the instrument substantially level.

Instead of passing the bolt 14 through the fabric of the top, a suitable fabric strip may be sewn or otherwise secured on the inside of the fabric of the top and the mounting plate 13 secured thereto, if desired.

The instrument 10 may be mounted in the rings 17 and 18 on pivots 19 and 20, respectively, arranged at right angles to each other, such a suspension being known as a gimbal suspension. In this case the bolts or posts 15 and 16 pass through ears secured to the outer ring 18 so that the instrument is free to swing into horizontal position regardless of lateral tipping or fore-and-aft tilting of the automobile. The low center of gravity and the fact that the instrument faces down permits of this gimbal suspension being secured in a compact and advantageous manner.

The instrument itself comprises the glass base plate 21 which forms not only the transparent cover for the instrument, but also a mounting or frame plate bearing the pivot stud 22.

Figure 2:
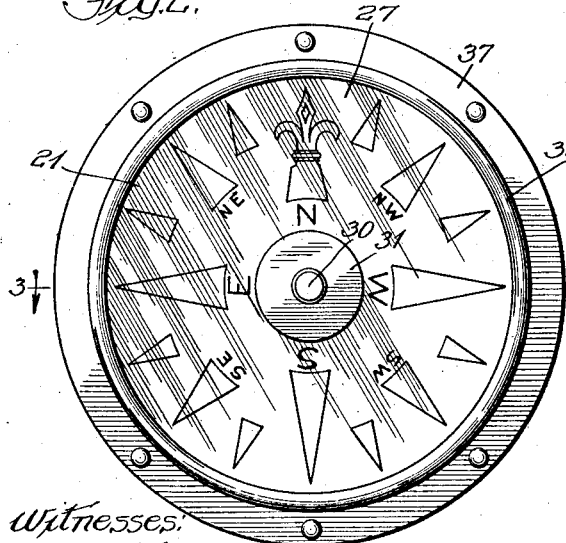
Fig. 2 is a bottom plan view of the device shown in Fig. 1.

This pivot stud 22 has a suitable pin or pivot 23 which engages a jewel 24 mounted in a suitable cup 25, said cup being formed on a bracket 26 secured to the indicating dial 27. Upon the back of the dial there are mounted a pair of brackets 28 in which are secured the magnetized bars 29 for controlling the position of the dial plate 27. The stud 22 has at its lower end a head 30 which clamps a center plate 31 against the bottom of the glass 21, and a nut 32 centered on the upper end of the stud 22 engages a washer 33 which in turn rests upon the top of the glass plate 21. The glass plate 21 is held in a cup 35 which has a lower bezel or ring 36 and an upper flange 37. An inner ring 38 has an inwardly extending flange 39 which is adapted to engage the upper margin of the glass plate 21 for holding it in position. A top plate 40 overlies the cup 35 and the ring 38, holding them in position upon the edges of the glass plate 21, said plate 40 being clamped to the flange 37 of the cup 35. The bottom face of the dial plate 27 contains the suitable mariner's card, as shown in full view in Fig. 2.

The instrument may be damped with liquid or any other well known damping means to steady the dial plate against vibration due to the movement of the vehicle, and to steady the magnetic action of the dial plate so that it will move into position without oscillating to and fro many times before coming to rest.

I do not intend to be limited to the precise details shown or described, as it will be apparent that other ways may be provided for securing the broad results which I am the first to accomplish.

I believe that the operation of the device is apparent from the above detailed description.

I claim:—

1. In combination, a housing open at its opposite ends, an outwardly turned flange at the upper end of said housing, an inwardly turned bezel flange at the lower end of said housing, a cover plate, means for securing the same over the upper outwardly turned flange, a transparent plate overlying said bezel flange, means including said flange for securing said plate in said housing, a dial, means for suspending said dial in said housing between the upper cover plate and said transparent plate, a pair of brackets, means for mounting the same on the back of said dial, and a plurality of magnetic bars, means for securing said bars in said brackets for controlling the position of said dial plate.

2. In combination, an automobile top, and a magnetic compass secured to said top and having an indicator facing downwardly, the mounting for said compass comprising a mounting plate, means securing the mounting plate beneath said top, a plurality of bolts secured to said plate and extending downwardly therefrom, a ring secured to the lower ends of said bolts and held in a substantially horizontal plane thereby, and an inner ring pivoted within said first ring, said compass being pivoted within said inner ring, the pivot of said compass being at right angles to the pivot of said inner ring.

In witness whereof, I hereunto subscribe my name this 3rd day of March, 1923.

JOHN S. GULLBORG.